United States Patent
Park et al.

(10) Patent No.: US 9,351,280 B2
(45) Date of Patent: May 24, 2016

(54) APPARATUS AND METHOD FOR PROVIDING MULTICAST AND BROADCAST SERVICE IN MOBILE COMMUNICATION ENVIRONMENT

(71) Applicant: ELECTRONICS AND TELECOMMUNICATIONS RESEARCH INSTITUTE, Daejeon-si (KR)

(72) Inventors: Dae-Geun Park, Daejeon-si (KR); Han-Nah Kim, Gyeongsangbuk-do (KR)

(73) Assignee: ELECTRONICS AND TELECOMMUNICATIONS RESEARCH INSTITUTE, Daejeon-si (KR)

( * ) Notice: Subject to any disclaimer, the term of this patent is extended or adjusted under 35 U.S.C. 154(b) by 70 days.

(21) Appl. No.: 14/047,543

(22) Filed: Oct. 7, 2013

(65) Prior Publication Data
US 2014/0098733 A1   Apr. 10, 2014

(30) Foreign Application Priority Data
Oct. 8, 2012   (KR) ................. 10-2012-0111555

(51) Int. Cl.
*H04L 12/28* (2006.01)
*H04W 72/00* (2009.01)
*H04W 76/00* (2009.01)

(52) U.S. Cl.
CPC .......... *H04W 72/005* (2013.01); *H04W 76/002* (2013.01)

(58) Field of Classification Search
None
See application file for complete search history.

(56) References Cited

U.S. PATENT DOCUMENTS

| | | | | |
|---|---|---|---|---|
| 8,391,878 | B2* | 3/2013 | Tenny | H04H 20/42 455/450 |
| 8,660,050 | B2* | 2/2014 | Kim et al. | 370/312 |
| 8,873,448 | B2* | 10/2014 | Lavi | H04W 36/0072 370/312 |
| 2008/0253322 | A1* | 10/2008 | So et al. | 370/329 |
| 2009/0041045 | A1* | 2/2009 | Yang et al. | 370/401 |
| 2009/0207773 | A1* | 8/2009 | Feng et al. | 370/312 |
| 2012/0163272 | A1* | 6/2012 | Chung et al. | 370/312 |
| 2013/0021961 | A1* | 1/2013 | Park | 370/312 |

FOREIGN PATENT DOCUMENTS

| | | |
|---|---|---|
| KR | 1020090039223 A | 4/2009 |
| KR | 1020100006421 A | 1/2010 |
| WO | 2013/005935 A2 | 1/2013 |

OTHER PUBLICATIONS

Hu et al, MBS zone configuration schemes for wireless multicast and broadcast service, Wireless Communications and Mobile Computing, pp. 1589-1604, 2010.*

(Continued)

*Primary Examiner* — Frank Duong
(74) *Attorney, Agent, or Firm* — Ladas & Parry LLP

(57) ABSTRACT

Provided are an apparatus and method for providing a multicast and broadcast service (MBS) in a mobile communication environment. The method includes setting an MBS zone to be provided with content and include at least one member base station, configuring the MBS zone by classifying the at least one member base station belonging to the MBS zone into active members that simultaneously transmit MBS traffic and an MBS control parameter and inactive members that transmit only the MBS control parameter according to a predefined rule, and connecting a data delivery path through the active member to transmit the MBS traffic to a terminal.

21 Claims, 11 Drawing Sheets

(56) References Cited

OTHER PUBLICATIONS

Li et al, Handover Delay Reduction and Buffer-Based Data Recovery Scheme for Inter Multicast Broadcast Service Zone, IEEE, 5 pages, 2011.*

Lee et al, Proactive Transmission-based QoS Provisioning for Multicast and Broadcast Services in Mobile WiMAX Systems, ACM, 6 pages, 2009.*

Ji Hoon Lee, et al; "Reducing Handover Delay by Location Management in Mobile WiMAX Multicast and Broadcast Services", IEEE Transaction on Vehicular Technology, vol. 60, No. 2, Feb. 2011, pp. 605-617.

Ji Hoon Lee, et al; "Location Management Area (LMA)-based MBS Handover in Mobile WiMAX Systems", Published in Communication Systems Software and Middleware and Workshops in Jan. 2008 (COMSWARE 2008, $3^{rd}$ International Conference pp. 341-348.

* cited by examiner

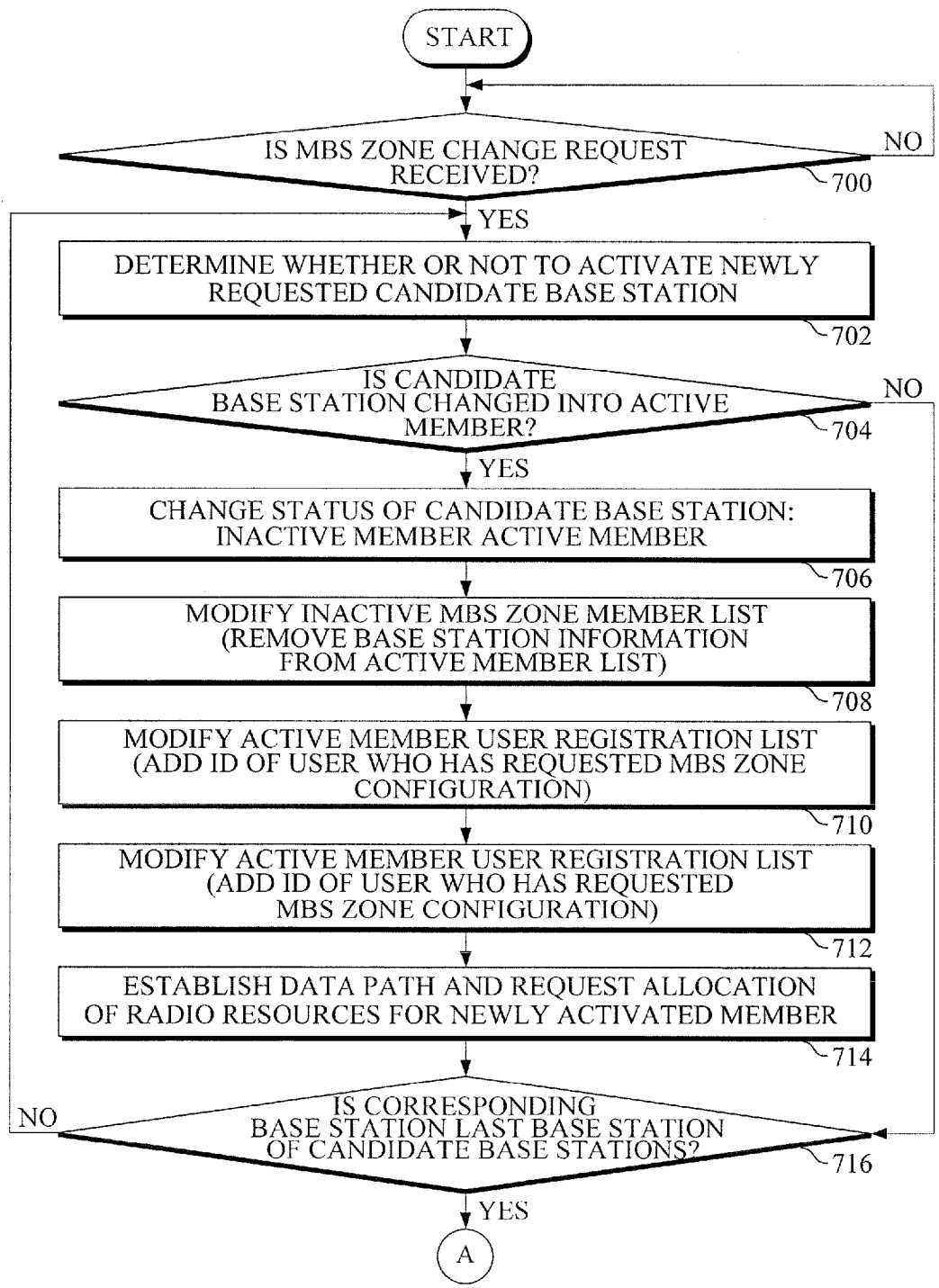

APPARATUS AND METHOD FOR PROVIDING MULTICAST AND BROADCAST SERVICE IN MOBILE COMMUNICATION ENVIRONMENT

CROSS-REFERENCE TO RELATED APPLICATION

This application claims the benefit under 35 U.S.C. §119(a) of Korean Patent Application No. 10-2012-0111555, filed on Oct. 8, 2012, the entire disclosure of which is incorporated herein by reference for all purposes.

BACKGROUND

1. Field

The following description relates to an apparatus and method for providing a multicast and broadcast service (MBS) in a mobile communication environment, and more particularly, to a method of configuring a broadcast area in which a broadcasting service is provided by a mobile communication system and providing a broadcasting service to a plurality of users present in the configured broadcast area and a system for implementing the method.

2. Description of the Related Art

Description made here merely provides background information on embodiments of the present invention, and does not necessarily constitute related art.

To provide an MBS in various mobile communication systems, standards organizations such as Institute of Electrical and Electronics Engineers (IEEE) 802.16e, IEEE 802.16m, Third Generation Partnership Project (3GPP)/Long Term Evolution (LTE), and Worldwide Interoperability for Microwave Access (WiMAX) Forum are proposing the MBS under the names of MBS, enhanced-MBS (E-MBS), multicast broadcast multimedia service (MBMS), enhanced-MBMS (E-MBMS), multicast broadcast service (MCBCS), and so on. In particular, in IEEE 802.16e or IEEE 802.16m (referred to as IEEE 802.16 below), a plurality of base stations are included in one broadcasting service area, in which an MBS standard in which all the base stations send broadcast content to mobile terminals using the same radio resources is determined as a standard of the broadcasting service area, and the MBS broadcast area is defined as an MBS zone or an E-MBS zone.

Referring to FIG. 1, the MBS zone defined in IEEE 802.16e or IEEE 802.16m corresponds to (a). (a) shows an MBS transmission area consisting of two MBS zones. As shown in (a), the MBS zone defined in IEEE 802.16 has a fixed form. In the case of a fixed MBS zone, all base stations constituting the MBS zone (each of the base stations constituting the MBS zone is referred to as a member base station) transmit an MBS signal using the same resources. Thus, a mobile terminal recovers a received signal using all the MBS signals transmitted by the base stations belonging to the MBS zone, and thus can obtain the macro-diversity effect of improving the reception quality of the signal. On the other hand, the member base stations constituting the MBS zone keep channel resources allocated for an MBS. Thus, when there is no MBS user, only a few users are provided with the MBS, or MBS users are concentrated in a very small area, radio resources are wasted.

To solve this problem of an MBS based on IEEE 802.16, some kinds of research have been carried out. The paper "Location Management Area (LMA)-based MBS Handover in Mobile WiMAX Systems" proposes a method of dividing a fixed MBS zone into a plurality of areas referred to as LMAs, allocating broadcast resources to only an LMA in which an MBS mobile terminal is present, and thereby causing not all base stations but only base stations belonging to the LMA to participate in an MBS and saving radio resources. Configurations of MBS zones in accordance with this method are shown in (b). In this method, the MBS zones are subdivided into fixed MBS zones of smaller size. Like the aforementioned method based on IEEE 802.16, this method still has the problem of resource waste dependent on the number of MBS users and the distribution of the users. A third method is a method proposed in WO2013/005935 that has been submitted as a provisional application by the present inventor. As shown in (c), in this method, some base stations that receive signals of excellent quality from a mobile terminal constitute an MBS zone among base stations in a predetermined area. In this method, only the few base stations selected by the mobile terminal participate in MBS traffic transmission, and the member base stations of the MBS zones are dynamically changed according to a channel state between the mobile terminal and base stations. Such a method of dynamically configuring an MBS zone can remarkably reduce the amount of radio resources allocated for an MBS when MBS users are concentrated in a small area, or there are a small number of MBS users.

However, when the number of users increases, or the distribution of the users becomes wider, almost all base stations participate in the MBS, and the MBS becomes similar to the MBS based on IEEE 802.16e/m. As shown in FIG. 1, this method has a drawback in that it is difficult to manage allocation of a service channel. In other words, in the method based on IEEE 802.16, it is possible to readily configure two service channels using the same amount of radio resources. However, in the dynamic setup method, when the distribution of users who use the same MBS becomes wider, only one channel may be formed in an entire MBS transmission area. As a result, it becomes difficult for a service provider to manage channels.

For this reason, there is a need for a method of maintaining the ease of allocation and management of an MBS channel, which is the advantage of a fixed MBS zone configuration based on IEEE 802.16, and also efficiently using radio resources for an MBS like the LMA method or the dynamic MBS zone setup method taking a case in which there are only a few MBS users, or MBS users are concentrated in a small area into consideration.

SUMMARY

The following description relates to an apparatus and method for providing a multicast and broadcast service (MBS) of better quality in a mobile communication network according to a method of maintaining the ease of allocation and management of an MBS channel, which is the advantage of a fixed MBS zone configuration based on Institute of Electrical and Electronics Engineers (IEEE) 802.16, and also reducing radio resources used for the MBS even when there are only a few MBS users, or MBS users are concentrated in a limited area.

In one general aspect, a method of providing an MBS in a mobile communication environment includes: setting an MBS zone to be provided with content and include at least one member base station; configuring the MBS zone by classifying the at least one member base station belonging to the MBS zone into active members that simultaneously transmit MBS traffic and an MBS control parameter and inactive members that transmit only the MBS control parameter according to a predefined rule; and connecting a data delivery path through the active member, and transmitting the MBS traffic to a terminal.

Here, channel quality information (CQI) may be used in the configuring of the MBS zone. Also, the configuring of the MBS zone may include determining the active member among the at least one member base station belonging to the MBS zone on the basis of whether or not there are radio resources usable for the MBS.

Meanwhile, the method may further include, when a specific event occurs, reconfiguring the NIBS zone by classifying the at least one member base station again into active members and inactive members.

Meanwhile, the method may further include retrieving radio resources of a member base station newly classified as an inactive member through the reconfiguring of the MBS zone, and in this case, the retrieved radio resources may be allocated for another service or left as they are without being allocated to another type of service.

In another general aspect, an apparatus for providing an MBS in a mobile communication environment includes: a proxy unit configured to set an MBS zone to be provided with content and include at least one member base station, and configure the MBS zone by classifying the at least one member base station belonging to the MBS zone into active members that simultaneously transmit MBS traffic and an MBS control parameter and inactive members that transmit only the MBS control parameter according to a predefined rule; and a data delivery path manager configured to establish a data delivery path through the active member determined by the proxy unit, and control the MBS traffic to be transmitted to a terminal.

Other features and aspects will be apparent from the following detailed description, the drawings, and the claims.

BRIEF DESCRIPTION OF THE DRAWINGS

FIGS. 7A and 7B are flowcharts illustrating a method for an MBS controller to configure an MBS zone when a user terminal requests a change of MBS zone.

Figure 1:
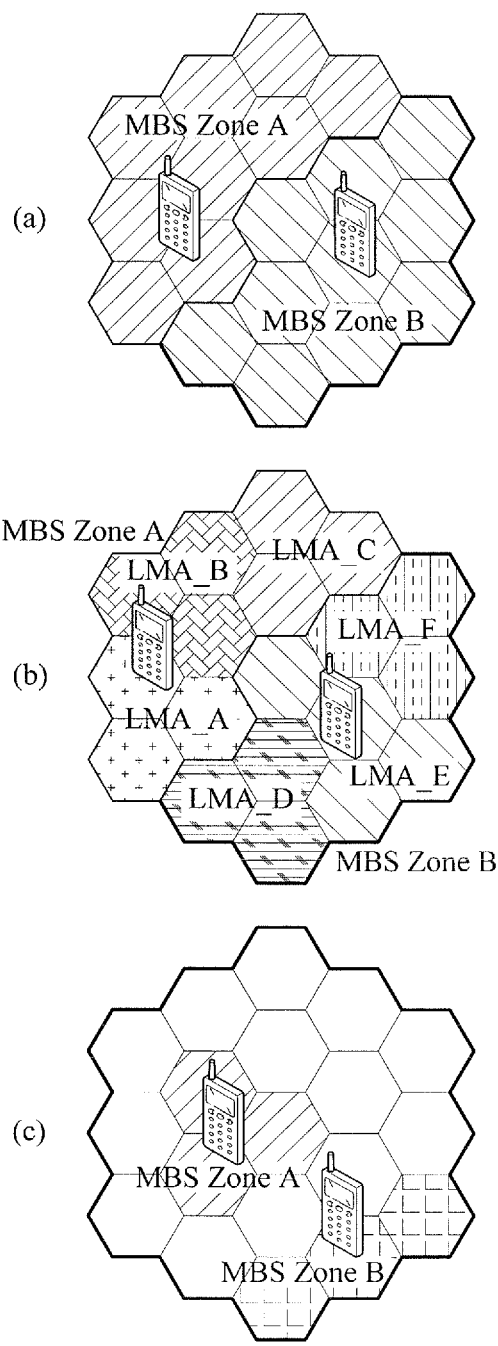
FIG. 1 is a diagram illustrating existing methods of configuring a multicast and broadcast service (MBS) zone for a mobile broadcasting service in a mobile communication environment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

It will be understood that, although the terms first, second, A, B, (a), (b), etc. may be used herein to describe various elements, these elements should not be limited by these terms. These terms are only used to distinguish one element from another, and do not limit the essence, sequence, etc. of the elements. It will be understood that when an element is referred to as being "connected" or "coupled" to another element, it can be directly connected or coupled to the other element or an intervening element may be "connected" or "coupled" between the respective elements.

Figure 2:
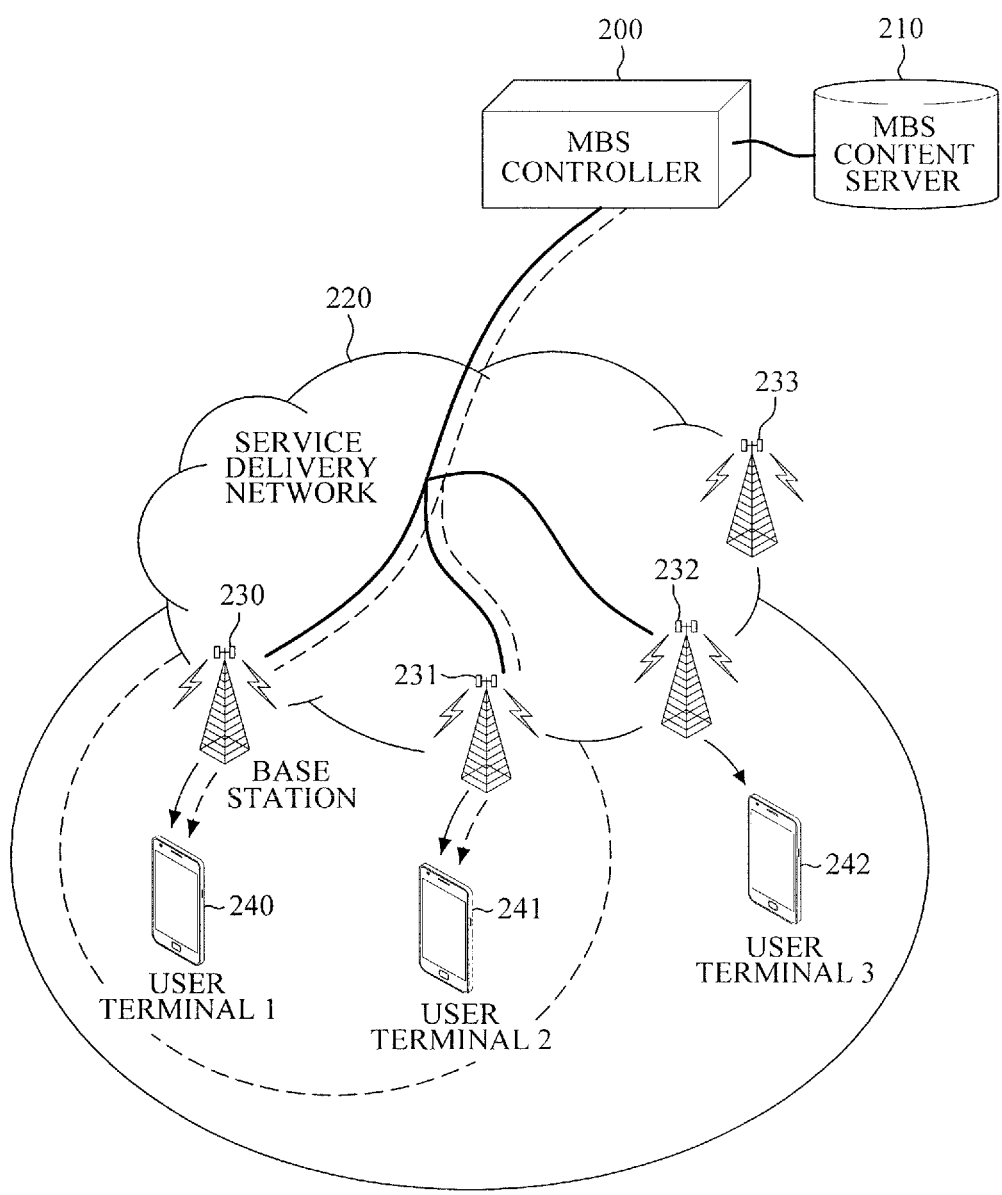
FIG. 2 is a diagram schematically illustrating a system and method for configuring a broadcast area for providing unicast and multicast services in a mobile communication system according to an exemplary embodiment of the present invention.

FIG. 2 is a diagram schematically illustrating a system and method for configuring a broadcast area for providing unicast and multicast services in a mobile communication system according to an exemplary embodiment of the present invention.

A mobile communication network in which a multicast and broadcast service (MBS) is taken into consideration includes an MBS controller 200, base stations 230 to 233, MBS user mobile terminals (also referred to as "user mobile terminals" or "mobile terminals" below) 240 to 242, an MBS content server 210, and a service delivery network 220.

The MBS controller 200 executes an MBS zone configuration management function, such as generation, changes, and cancelation for an MBS area, and manages service subscription and cancellation of the user mobile terminals 240 to 242, and controls radio resource allocation of the base stations 230 to 233 and a transmission time point of MBS traffic such that the MBS traffic and MBS control information are multicast in a radio section.

The base stations 230 to 233 multicast the MBS traffic and the MBS control information into an MBS zone using radio resources designated under the control of the MBS controller 200, and provide the user mobile terminals 240 to 242 with a wireless connection service that is necessary to receive the MBS traffic and the MBS control information. The user mobile terminals 240 to 242 deliver MBS requests through the base stations 230 to 233, and receive the MBS traffic requested by themselves using the MBS control information received from the base stations 230 to 233.

The MBS content server 210 contains content of service requested by the user mobile terminals 240 to 242. In FIG. 2, a solid line indicates an area that can be provided with one MBS, that is, an MBS zone. On the other hand, a dotted line indicates an area to which MBS traffic and MBS-related control information are transmitted together. In FIG. 2, among lines connecting the MBS controller 200 with the base stations 230 to 233, solid lines denote MBS traffic, and dotted lines denote control information (or a control parameter) necessary to receive the MBS traffic. In an embodiment of the present invention, the service delivery network 220 denotes a communication network among the MBS controller 200 and the base stations 230 to 233, and a subscriber network denotes a radio section among the base stations 230 to 233 and the user mobile terminals 240 to 242.

Figure 3:
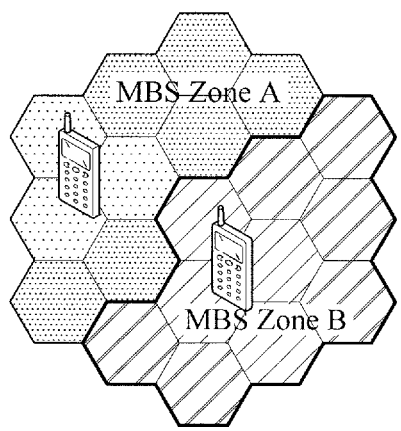
FIG. 3 is a diagram illustrating the system shown in FIG. 2 using cells.

FIG. 3 is a diagram illustrating the system shown in FIG. 2 using cells.

In FIG. 3, cells that are not filled with diagonal lines are member base stations that transmit MBS traffic and MBS control information together, and cells that are filled with diagonal lines are member base stations that transmit only MBS control information. In an embodiment of the present invention, member base stations constituting a fixed MBS zone are classified into base stations that transmit both MBS traffic and MBS control information and base stations that transmit only MBS control information. The former base stations are referred to as active MBS member base stations or active member base stations, and the latter base stations are referred to as inactive MBS member base stations or inactive member base stations. Also, an area consisting only of active MBS member base stations in an MBS zone is referred to as an active MBS zone.

Referring to FIG. 3, an entire MBS transmission area is divided into two MBS zones. The transmission area of each MBS zone is fixed, and each MBS zone sends MBS content using each different radio resource. Here, the content provided from two MBS zones may be same or different to each other. Such fixed MBS zone is configured in advance by the subject who manages the content before the service, and the configuration information has been already set in the MBS controller before each member base station determines an active or inactive member. Between the two zones divided by a relatively thick line, fixed MBS zone A on the left side consists of an active zone consisting of three active member base stations and inactive zones consisting of six inactive member base stations, and fixed MBS zone B on the right side consists of an active zone consisting of four active member base stations and inactive zones consisting of six inactive member base stations.

To classify MBS zones into active zones and inactive zones, the user mobile terminals 240 to 242 select candidate base stations for member base stations of the active zones, and transmit the selection information to the MBS controller 200. To this end, the user mobile terminals 240 to 242 measure the quality of signals transmitted by base stations that the user mobile terminals 240 to 242 are currently connected with (referred to as "serving base stations" below) and surrounding base stations. The user mobile terminals 240 to 242 select at least one base station using the measured quality values of signals, and transmit information on the selected base station to the MBS controller 200 through the serving base stations. The MBS controller 200 changes each active member base station candidate into an active member base station or an inactive member base station according to a predefined criterion. The MBS controller 200 finds whether an active member base station candidate sent by a user is currently an active member base station or an inactive member base station in an MBS zone, thereby determining a final status of the member base station candidate. When the active member base station candidate sent by the user is in the active state, the MBS controller 200 does not need to control activation of the requested candidate. On the other hand, when the active member base station candidate sent by the user is in the inactive state, the MBS controller 200 changes the active member base station candidate into an active member base station or controls the active member base station candidate to maintain the inactive member base station status.

At the initial stage of an MBS, periodically or intermittently in the middle of the MBS, and after handover, the user mobile terminals 240 to 242 may select and send active member base station candidates to the MBS controller 200. To finish use of the MBS, the user mobile terminals 240 to 242 send messages that notify the MBS controller 200 of service cancellation. At this time, the user mobile terminals 240 to 242 may send information on active member base station candidates that they have finally transmitted together with the message notifying the MBS controller 200 of service cancellation. When the user mobile terminals 240 to 242 notify the MBS controller 200 of service cancellation, the MBS controller 200 determines whether to retrieve radio resources used by active member base stations related to the users. When there are no more users who use the MBS through the related active member base stations, the MBS controller 200 changes the active member base station into an inactive member base station. Otherwise, the MBS controller 200 controls the active member base station to maintain the active member base station status as it is. The MBS controller 200 may configure an active MBS zone with active member base station candidates sent by the user mobile terminals 240 to 242 as described above, or may configure an active MBS zone by itself without information sent by the user mobile terminals 240 to 242.

Figure 4:
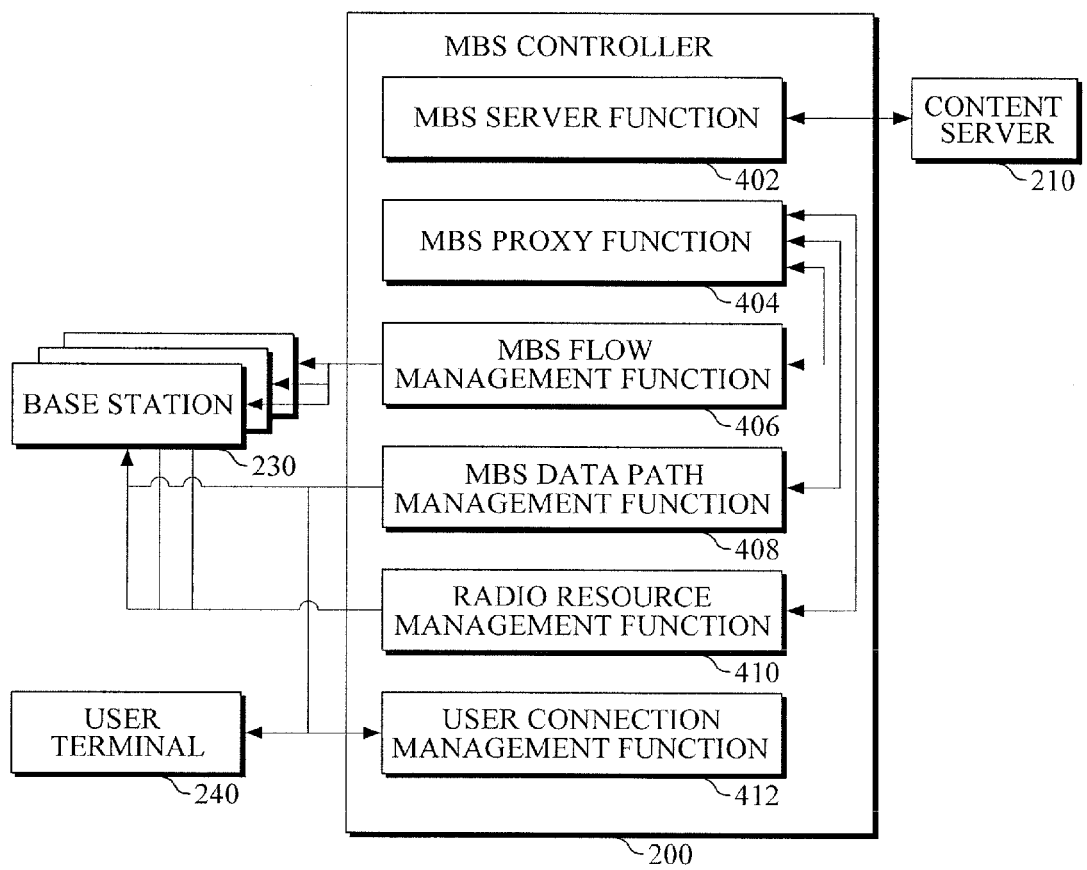
FIG. 4 is a block diagram illustrating functions of an MBS controller provided in mobile Worldwide Interoperability for Microwave Access (WiMAX) according to an embodiment of the present invention.

FIG. 4 is a block diagram illustrating functions of the MBS controller 200 provided in mobile Worldwide Interoperability for Microwave Access (WiMAX) according to an embodiment of the present invention.

In FIG. 4, an MBS server function 402 performs Internet protocol (IP) multicast group management, MBS program management, management and distribution of an MBS announcement and service guide, mobile terminal and network session management, and a security function such as data encryption.

An MBS proxy function 404 serves to connect a service delivery network with the content server 210 so as to support network session management, give a parameter value such as an MBS zone identifier (ID) or a multicast connection ID (MCID) to a previously-configured MBS zone, monitor multicast transmission in a service delivery network, and control an MBS data path management function 408 to start an operation of establishing or releasing a data path with a member base station in an MBS zone.

An MBS flow management function 406 serves to process service subscription and cancellation requests sent by MBS users according to service profiles of the users, set a service flow ID (SFID) indicating an MBS flow to be transmitted to the user mobile terminals 240 to 242, and interoperate with an MBS proxy to create and cancel a service flow.

The MBS data path management function 408 performs an operation of establishing, maintaining, and releasing an MBS traffic path, an operation of classifying and distributing MBS traffic, an operation of delivering MBS traffic from an MBS server to an MBS synchronization control function for the purpose of synchronization, and so on.

The radio resource management function 410 performs an operation of allocating and retrieving radio resources for transmission of MBS traffic.

The user connection management function 412 performs an operation of registering the user mobile terminals 240 to 242 in the service delivery network.

The respective functions of the MBS controller 200 described above may be present in different devices or implemented in one device.

Meanwhile, a function of determining active/inactive member base stations and configuring, maintaining and canceling active and inactive zones is added to the aforementioned MBS proxy function of the mobile WiMAX MBS controller 200, which will be described with reference to FIG. 6 to FIG. 10.

Figure 5:
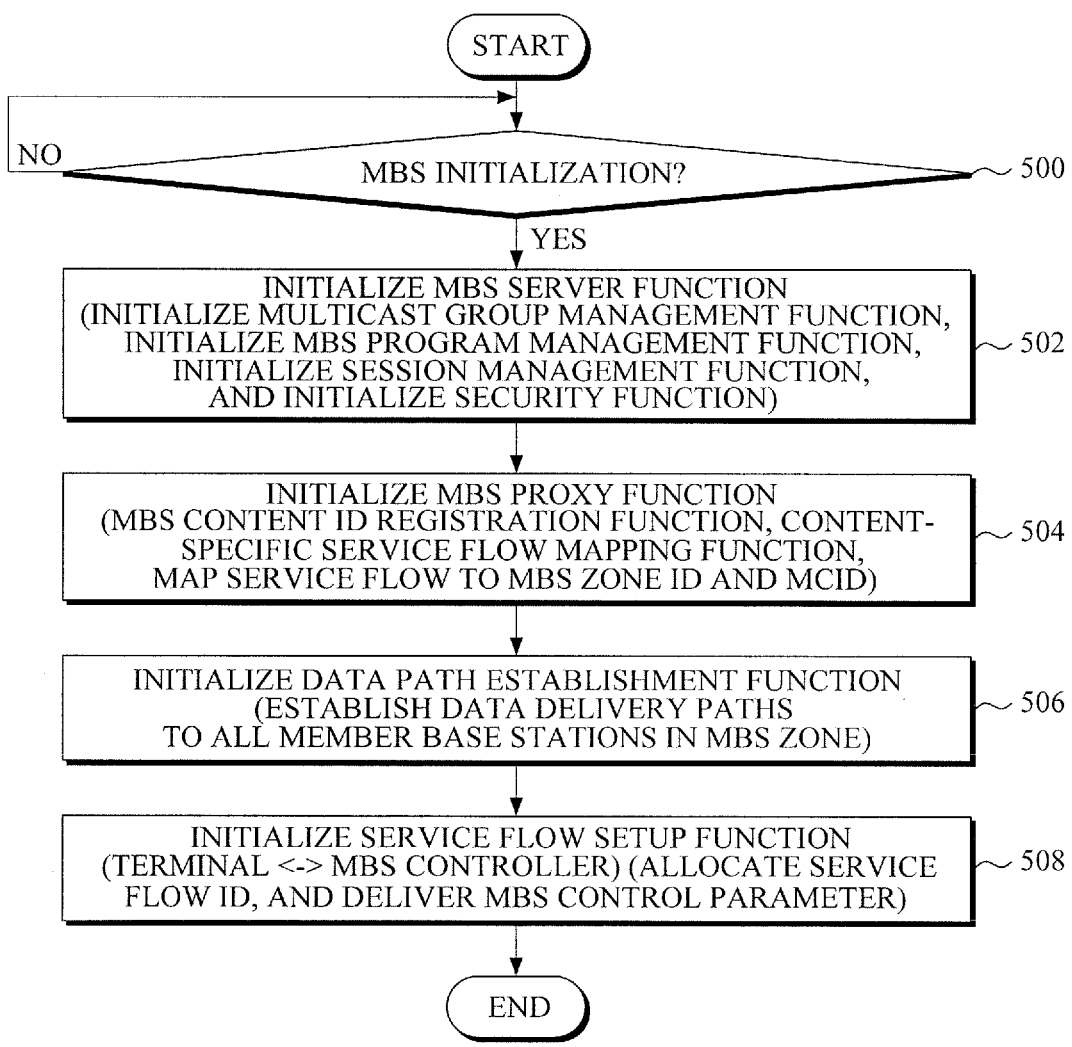
FIG. 5 is a flowchart illustrating. MBS initialization in mobile WiMAX based on Institute of Electrical and Electronics Engineers (IEEE) 802.16.

FIG. 5 is a flowchart illustrating MBS initialization in mobile WiMAX based on Institute of Electrical and Electronics Engineers (IEEE) 802.16.

First, the MBS server function 402 of the MBS controller 200 initializes the aforementioned MBS server functions of the MBS controller 200. Next, through initialization of the MBS proxy function 404, a relationship between each piece of MBS content and an MBS zone to which the piece of content will be sent is established in advance. From these relationships, the MBS controller 200 finds an MBS zone to which content sent by the content server 210 will be sent, and a service flow used to send the content. Also, it is possible to know member base stations corresponding to the MBS zone. Next, the MBS data path management function 408 of the MBS controller 200 establishes a delivery path of data necessary to deliver content provided by the content server 210 in the service delivery network 220. At this time, the data delivery path is established between the MBS controller 200 and the member base stations. A data delivery function present in the member base stations corresponds to a data delivery function of the MBS controller 200. In the last operation, the service flow management function 406 of the MBS controller 200 creates a service flow such that control information for sending the content in the form of MBS in a subscriber network is sent to all the member base stations of the MBS zone, and MBS subscribers can receive the content in the form of MBS. The service flow management function 406 creates the service flow between the MBS controller 200 and the subscribers.

Figure 6:
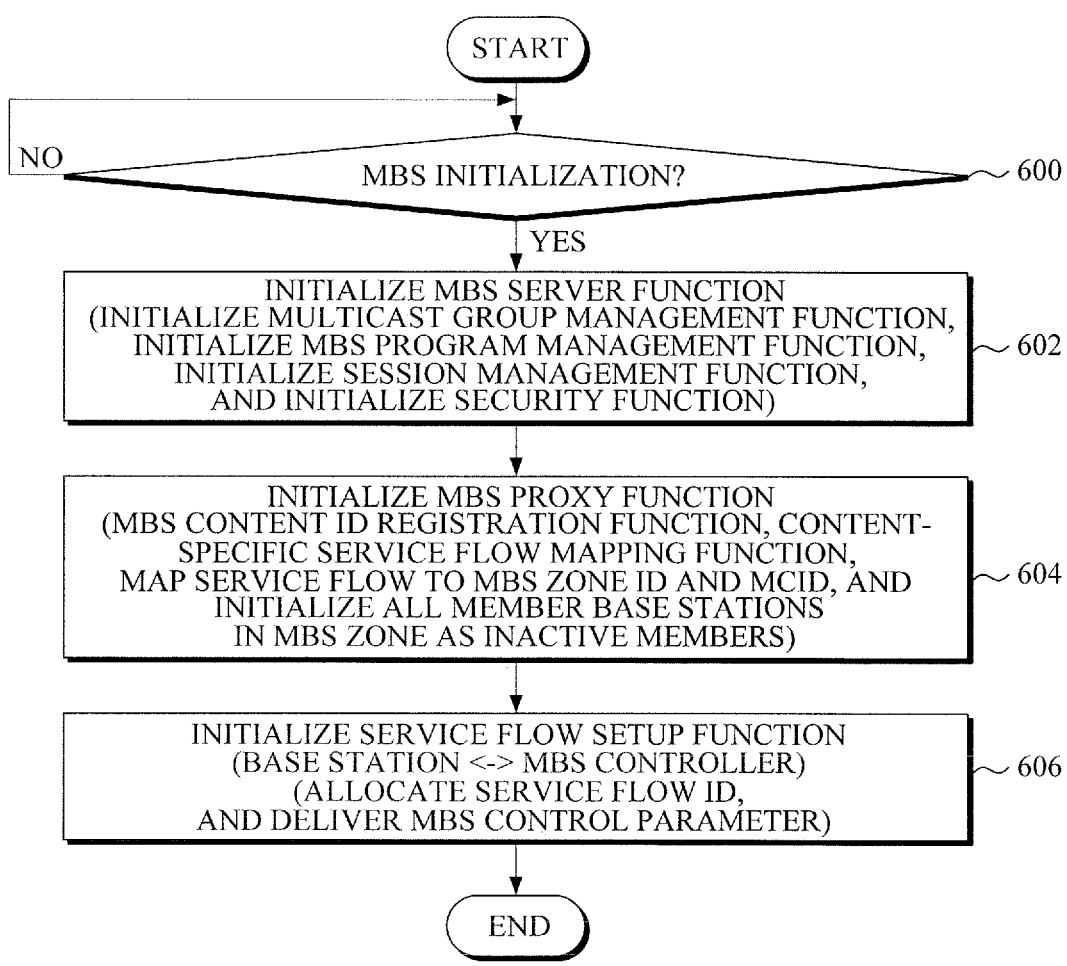
FIG. 6 is a flowchart illustrating MBS initialization according to an embodiment of the present invention.

FIG. 6 is a flowchart illustrating MBS initialization according to an embodiment of the present invention.

In an embodiment of the present invention, an MBS system initializes an MBS server function upon MBS initialization, like mobile WiMAX illustrated in FIG. 5. Like in the flowchart of FIG. 5, an MBS proxy function also establishes a relationship between each piece of MBS content and an MBS zone to which the piece of content will be sent in advance through initialization. In addition to this, in an embodiment of the present invention, all member base stations constituting each MBS zone configured in the MBS proxy function initialization process are changed into inactive members, such that the entire MBS zone becomes an inactive zone. Next, upon initialization of a service flow setup function, a service flow is created between all inactive members and a service flow management function of an MBS controller, and MBS-related control information is sent to all the inactive members. However, no service flow is created between a terminal and a member base station, unlike mobile WiMAX. A service flow between a terminal and a member base station is created after an active zone for an MBS is configured, and then a data delivery path is established between a member base station constituting the configured active zone and a data path management function of the MBS controller. Unlike mobile WiMAX, no MBS data path is established during MBS initialization.

Figure 7B:
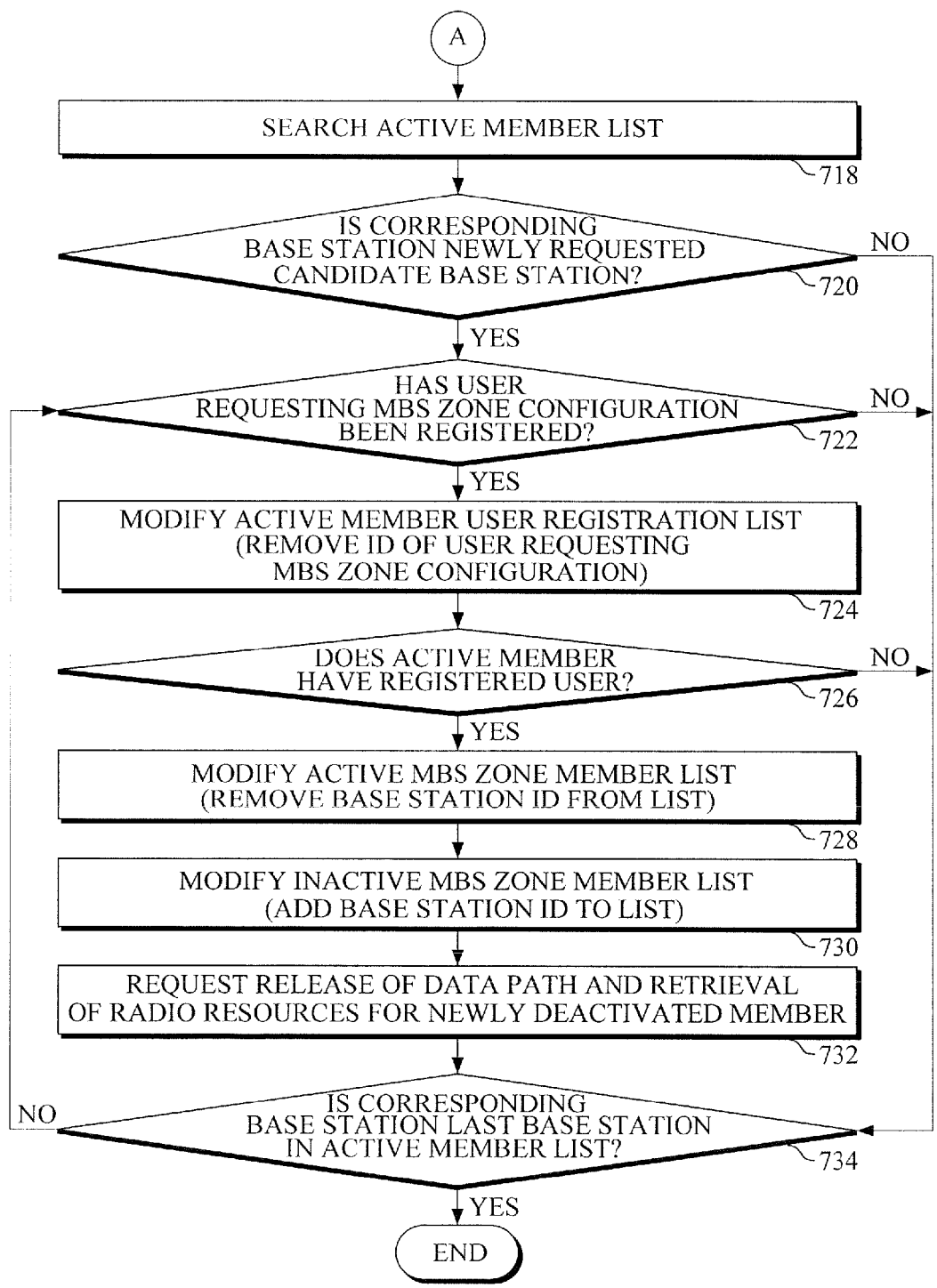

FIGS. 7A and 7B are flowcharts illustrating a method for an MBS controller to configure an MBS zone when a user terminal requests a change of MBS zone.

According to an active zone and an inactive zone that are characteristics of an embodiment of the present invention, when a configuration of an MBS zone is changed, active members constituting the zone are changed, or a new active zone is configured. When no MBS is provided yet after MBS initialization, all MBS zones are inactive zones. At this time, a user in an MBS zone sends an MBS request to an MBS proxy function of an MBS controller.

After that, the corresponding user terminal or serving base station selects information on some base station candidates that will become active members in the MBS zone and send MBS traffic to generate an active MBS zone change request, and sends the message to the MBS controller (operation 700). The candidate base stations may be selected according to various criteria. Alternatively, the terminal or the serving base station may not select candidate base stations to send information on the selected candidate base stations to the MBS controller. Rather, the terminal or the serving base station may measure wireless channel quality of all base stations that can be measured, contain the measured wireless channel quality in the active MBS zone change request message, and send the message to the MBS controller, and the MBS controller may select candidate base stations to be classified as active members using the wireless channel quality of the respective base stations.

The MBS controller changes statuses of the respective candidate base stations included in the active MBS zone change request message received from the user terminal or the serving base station into active members or inactive members. Then, the MBS controller configures an active zone and an inactive zone with these members (operation 702 to operation 710). Next, the MBS controller registers information on the user who has sent the active MBS zone change message in a base station that has been newly determined as a new active member (operation 712), and establishes an MBS data path to the base station having been determined as an active member (operation 714). Using a radio resource management function, the MBS controller requests allocation of radio resources necessary to transmit MBS traffic. When an active member has been changed into an inactive member, the MBS controller deletes all MBS user information registered in the member base station, and also removes or releases a data path that has been established to the member base station. Using the radio resource management function, the MBS controller requests retrieval of radio resources that have been used to transmit MBS traffic (operation 718 to operation 734).

An MBS zone change request is made when an MBS user starts the MBS, periodically while a user is provided with the MBS, after an MBS user is connected to a new serving base station through handover, and at other times.

Figure 8:
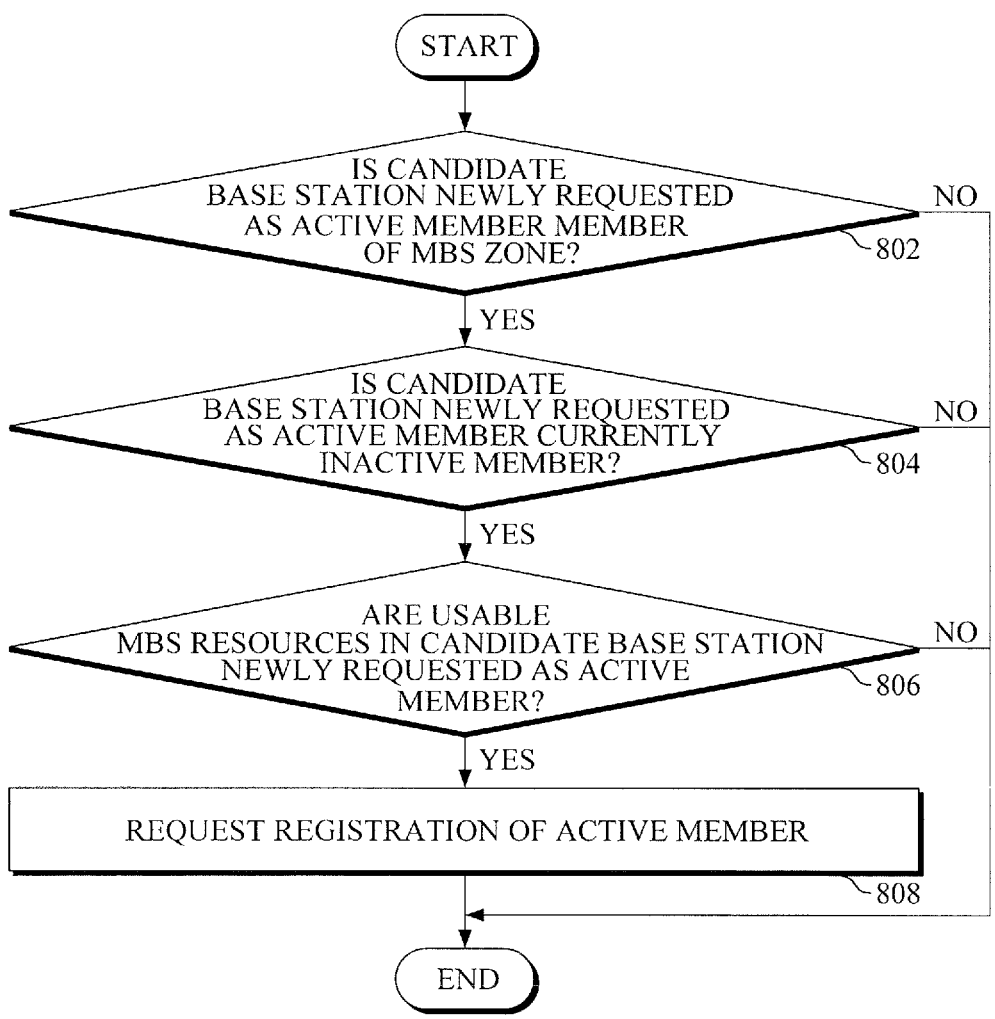
FIG. 8 is a flowchart illustrating criteria for an MBS proxy function to change an active base station candidate into an active member according to an embodiment of the present invention.

FIG. 8 is a flowchart illustrating criteria for an MBS proxy function to change an active base station candidate into an active member according to an embodiment of the present invention.

Referring to FIG. 8, as an active member, an MBS proxy function determines an active member base station candidate that is a member base station of an MBS zone in charge of an MBS requested by a user while having the inactive member status, and has radio resources usable for the MBS, from among active MBS member base station candidates. An active MBS member base station candidate that does not satisfy these conditions remains as an inactive member. These conditions illustrated in the flowchart can be selectively applied according to a policy of an MBS provider, and other conditions may be added to these active member determination conditions. Member base stations of an MBS zone are determined according to a policy of a provider, and a configuration of the MBS zone with the member base stations may also vary according to a policy of the provider.

Figure 9:
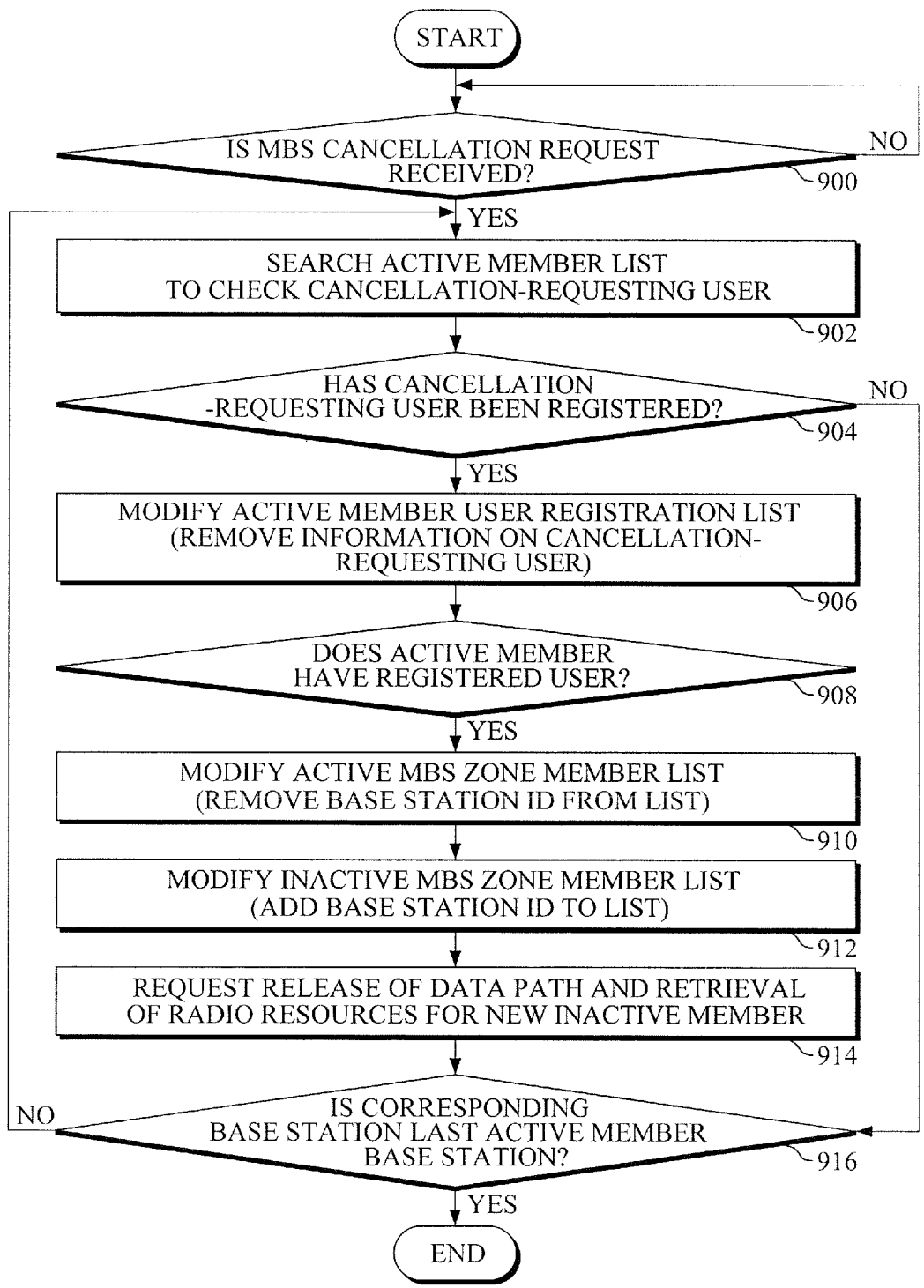
FIG. 9 is a flowchart illustrating a method for an MBS controller to change an MBS zone according to an embodiment of the present invention when a user terminal requests MBS cancellation.

FIG. 9 is a flowchart illustrating a method for an MBS controller to change an MBS zone according to an embodiment of the present invention when a user terminal requests MBS cancellation.

When there is an MBS cancellation request, member base stations of an active MBS zone and an inactive MBS zone are changed, and an active member zone may disappear according to circumstances.

When an MBS user cancels an MBS, the MBS controller 200 deletes all information on the cancellation requester present in an active member base station constituting an active zone. When no more MBS user remains in the active member base station, the MBS controller 200 changes the base station into an inactive member base station, and releases a data delivery path established between the base station and the MBS controller 200. Using a radio resource management function, the MBS controller 200 requests retrieval of radio resources that have been used to transmit MBS traffic.

Figure 10:
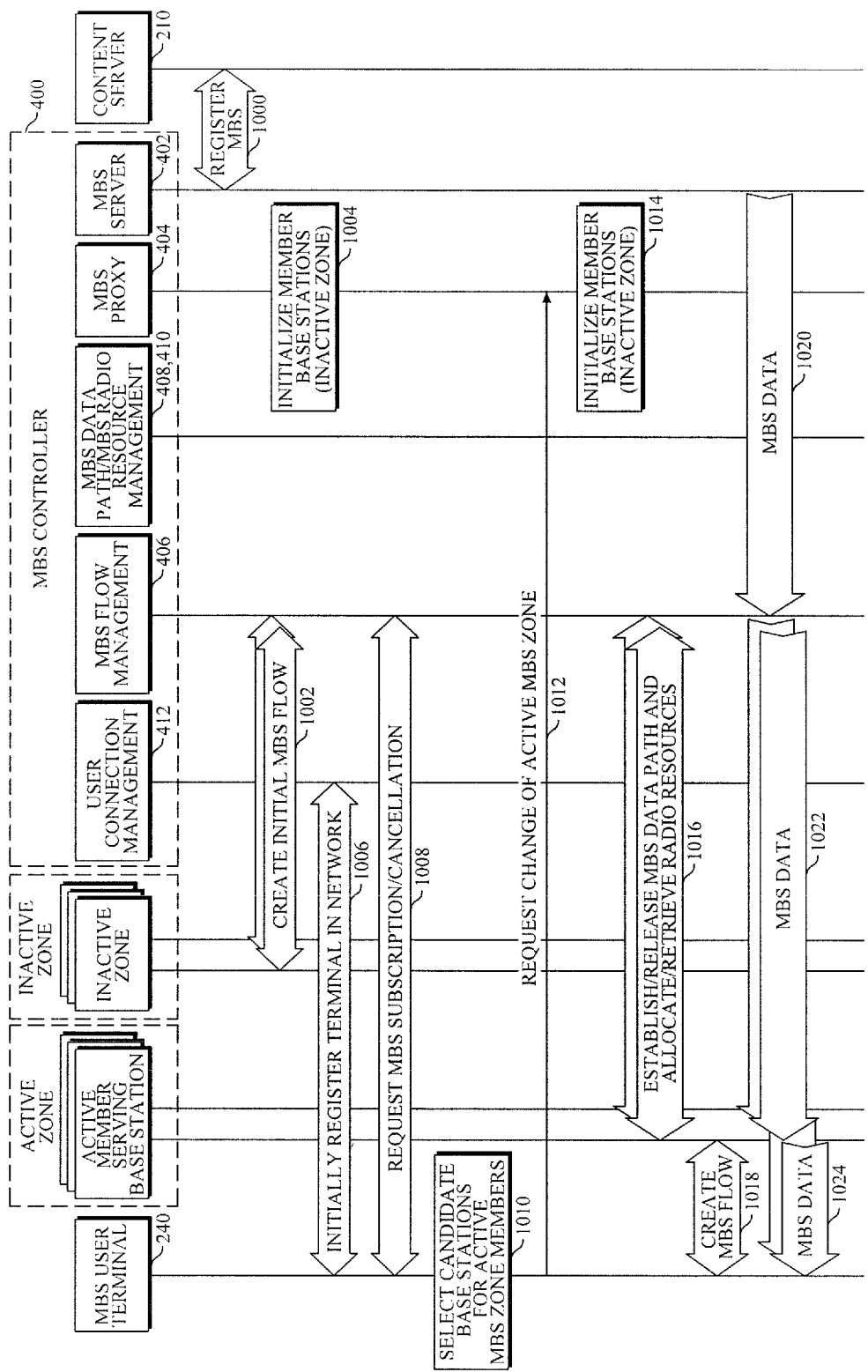
FIG. 10 is a flowchart illustrating an example of a method of transmitting MBS traffic to an MBS user according to an embodiment of the present invention.

FIG. 10 is a flowchart illustrating an example of a method of transmitting MBS traffic to an MBS user according to an embodiment of the present invention.

First, an example of a method for MBS initialization is described. An MBS proxy for the MBS controller 200 establishes a relationship between content to be transmitted through the content server 210 and an MBS server and an MBS zone to which the content is broadcast, through an MBS registration procedure. When MBS registration is finished, the MBS proxy for the MBS controller 200 sets all member base stations belonging to each MBS zone to inactive member base stations. Subsequently, an MBS flow management function of the MBS controller 200 creates an initial MBS flow with all the inactive member base stations, and sends control information necessary for MBS content transmission to the member base stations through this initial service flow setup process. The above process is performed before a first MBS user requests an MBS. When an MBS user requests an MBS before such MBS initialization is performed, the request is ignored. It is assumed that information on an MBS program selectable by the user mobile terminals 240 to 242 is received by all users in the MBS zone with MBS initialization.

Next, the following description concerns an example in which a user requests an MBS and receives the service when the MBS controller 200 configures an inactive zone with all member base stations in an MBS zone after an MBS system is subjected to initialization. First, when an MBS user selects a program that he or she wants to receive, and requests subscription to a desired MBS through a message such as an Internet group management protocol (IGMP) message, the request is received by an MBS flow management function. After requesting subscription to the MBS, a user terminal measures quality values of signals received from surrounding base stations to select candidate base stations for active members, generates an active MBS zone change request message from the selection information, and sends the active MBS zone change request message to an MBS proxy function directly or through a serving base station. At this time, the terminal may send the quality information measured by itself and the selection information to the serving base station together or separately. When the active MBS zone change request message sent by the terminal passes through the serving base station, the serving base station may send the message to the MBS proxy function as it is, or may newly select active member base station candidates using the information sent by the user terminal and send the selection information to the MBS proxy function as the active MBS zone change request message. Alternatively, the serving base station may newly select active member base station candidates using channel quality information (CQI) and surrounding base station-related information that the serving base station has, include the selection information in the active MBS zone change request message, and send the message to the MBS proxy function. Alternatively, the serving base station may newly select active member base station candidates by mixing the information sent by the user terminal and the information that the serving base station has, and send the selection information to the MBS proxy function as the active MBS zone change request message. In addition, at each time designated according to an MBS administration policy, the serving base station may select member base station candidates for a change of active MBS zone using the CQI and the surrounding base station-related information that the serving base station has, separately from the user terminal, generate an active MBS zone change request message from the selection information, and send the active MBS zone change request message to the MBS proxy function.

The MBS proxy function receiving the active MBS zone change request selects a candidate base station for an active member from the received candidate base stations among member base stations constituting the MBS zone, and configures an active zone with the selected active member. After that, an MBS data path management function of an MBS controller establishes an MBS data path to the base station that has newly become the active member. Also, a radio resource management function requests allocation of radio resources necessary for each active member base station to transmit MBS traffic. The MBS user terminal creates a service flow between the base station and the user terminal through a serving base station currently connected with the MBS user terminal. Through the service flow, the user terminal obtains information necessary to receive the MBS, such as an MBS zone ID, an MCID, and an SFID. Then, the active member base station sends MBS traffic received through a service delivery network to the user terminal using radio resources allocated for an MBS and control information necessary to send MBS traffic. The user terminal receives the MBS content passed through the MBS controller and the active member base station using the information obtained in the service flow setup operation. In the entire present invention, it is assumed that information on an MBS program is received through a separate procedure unrelated to an MBS.

Next, the following description concerns a case in which a user who is receiving MBS traffic sends an active MBS zone change request and thereby receives the MBS traffic while changing member base stations constituting an active MBS zone. First, a user terminal periodically measures and stores the quality of channels between surrounding base stations and the terminal. At each designated time, the terminal sends the stored channel quality values and base station information to an MBS proxy function directly or through a serving base station. At this time, the terminal may send the quality information measured by itself and the base station information to the serving base station together or separately. When an active MBS zone change request passes through the serving base station, the serving base station may send the message to the MBS proxy function as it is, may newly select active member base station candidates using the information sent by the user terminal and send the selection information to the MBS proxy function as the active MBS zone change request message, may newly select active member base station candidates using CQI and surrounding base station-related information that the serving base station has and send the selection information to the MBS proxy function as the active MBS zone change request message, or may newly select active member base station candidates by mixing the information sent by the user terminal and the information that the serving base station has and send the selection information to the MBS proxy function as the active MBS zone change request message. In addition, at each time designated according to an MBS administration policy, the serving base station may select member base station candidates for a change of active MBS zone using the CQI and the surrounding base station-related information that the serving base station has separately from the user terminal, generate an active MBS zone change request message from the selection information, and send the active MBS zone change request message to the MBS proxy function.

The MBS proxy function receiving the active MBS zone change request selects candidate base stations for new active members from the received candidate base stations among member base stations constituting an MBS zone, and reconfigures an active zone with the selected active members. After that, an MBS data path management function of an MBS controller establishes MBS data paths to the base stations that have newly become the active members. A radio resource management function requests allocation of radio resources necessary for the base stations that have newly become the active members to transmit MBS traffic. Also, an inactive zone is reconfigured with base stations that are changed from active members to inactive members by the active zone change request. Then, an MBS data path management function of the MBS controller releases MBS data paths that have been established between the base stations having newly become inactive members and the MBS controller. The radio resource management function retrieves radio resources that have been used to transmit MBS traffic by the member base stations having newly become inactive members. The retrieved radio resources may be used for another service or left as they are without being used for the other service according to a policy of a service provider. The member base stations that newly become active members send MBS content received through a service delivery network to the user terminal using the data paths newly established to send MBS content and the newly allocated radio resources together with MBS control information that has been being sent to the user terminal by the member base stations before the member base stations become active members. On the other hand, the base stations that have become inactive members return the radio resources used for an MBS, and release the data paths from which MBS traffic has been received, thereby stopping sending MBS content to the user terminal and sending only MBS control information. Then, the user terminal receives MBS content from the new active member base stations. MBS control information is received from all member base stations in the MBS zone.

Next, the following description concerns a case in which a serving base station of a user terminal is changed due to handover in an MBS zone. First, an MBS terminal performs handover from a serving base station to a target base station to be connected to a member base station in an inactive zone through a user connection management function of the target base station, and cuts off a connection with the previous serving base station. Then, the target base station in the other MBS zone becomes a new serving base station.

When the new serving base station is an active member, the new serving base station has been transmitting MBS control information and MBS traffic together, and it is possible to receive the MBS traffic using the MBS control information with no additional procedure like from the previous serving base station.

When the new serving base station is an inactive member, the new serving base station has not been sending actual MBS traffic but has been sending only control information used to receive MBS traffic. However, even when the new serving base station is not an active member, the user terminal receives control information related to MBS traffic, and thereby can receive MBS traffic sent by active members in the MBS zone with no additional procedure.

Immediately after handover is completely finished, the user terminal measures the quality of channels between surrounding base stations and the terminal, and sends the channel quality values and base station information to an MBS proxy function directly or through the serving base station. At this time, the user terminal may send the quality information measured by itself and the base station information to the serving base station together or separately. When an active MBS zone change request sent by the terminal passes through the serving base station, the serving base station may send the message to the MBS proxy function as it is, may newly select active member base station candidates using the information sent by the user terminal and send the selection information to the MBS proxy function as the active MBS zone change request message, may newly select active member base station candidates using CQI and surrounding base station-related information that the serving base station has and send the selection information to the MBS proxy function as the active MBS zone change request message, or may newly select active member base station candidates by mixing the information sent by the user terminal and the information that the serving base station has and send the selection information to the MBS proxy function as the active MBS zone change request message. In addition, at each time designated according to an MBS administration policy, the serving base station may select member base station candidates for a change of active MBS zone using the CQI and the surrounding base station-related information that the serving base station has separately from the user terminal, generate an active MBS zone change request message from the selection information, and send the active MBS zone change request message to the MBS proxy function. At each designated time after sending a first active MBS zone change request after handover, the user terminal or the serving base station generates an active MBS zone change request message in the same way as the first active MBS zone change request and sends the generated active MBS zone change request message to the MBS proxy function. The MBS proxy function selects candidate base stations for an active member from among the received candidate base stations. When there is a newly-selected active member, the MBS proxy function includes the newly-selected active member as a member in an active zone, and when an active member is changed into an inactive member, the MBS proxy function includes the inactive member as a member in an inactive zone. After that, an MBS data path management function of an MBS controller establishes MBS data paths between active members and the new active member base station. A radio resource management function requests allocation of radio resources necessary for the base station that has newly become an active member to transmit MBS traffic. Also, an MBS data path management function of the MBS controller releases an MBS data path that has been established between the base station having newly become an inactive member and the MBS controller. The radio resource management function retrieves radio resources that have been used to transmit MBS traffic by the member base station having newly become an inactive member. The retrieved radio resources may be used for another service or left as they are without being used for the other service according to a policy of a service provider. Then, the user terminal may receive MBS traffic passed through the serving base station that has been changed from an inactive member to an active member. At this time, it is unnecessary to create a service flow again between the user terminal and the serving base station. This is because the user terminal has already obtained information necessary to receive MBS traffic. In other words, in one MBS zone, it is necessary to create a service flow for MBS content only once.

Next, the following description concerns a case in which a user terminal performs handover to a member base station of another MBS zone. First, an MBS terminal performs handover from a serving base station to a target base station in another MBS zone to be connected to a member base station in the other MBS zone through a user connection management function of the target base station, and cuts off a connection with the previous serving base station. Then, the target base station becomes a new serving base station.

The user terminal receives MBS control information provided by the new serving base station. The user terminal finds that an MBS zone ID and an MCID, which are the MBS control information received from the new serving base station, are different from those received from the previous serving base station. Thus, it is necessary for the user terminal to newly request an MBS again in the moved MBS zone. To this end, an MBS user selects a program whose service he or she wants to receive. Here, an MBS selected by the MBS user may or may not have the same content as has been received from the previous serving base station, however, even when the selected MBS has the same content, control information on the MBS is different from control information from the previous serving base station. When subscription to the desired MBS is requested through a message such as an IGMP message, the request is received by an MBS flow management function. After requesting subscription to the MBS, the user terminal measures quality values of signals received from surrounding base stations to select candidate base stations for active members, generates an active MBS zone change request message from the selection information, and sends the active MBS zone change request message to an MBS proxy function directly or through the serving base station. At this time, the terminal may send the quality information measured by itself and the selection information to the serving base station together or separately. When the active MBS zone change request message sent by the terminal passes through the serving base station, the serving base station may send the message to the MBS proxy function as it is, or may newly select active member base station candidates using the information sent by the user terminal and send the selection information to the MBS proxy function as the active MBS zone change request message. Alternatively, the serving base station may newly select active member base station candidates using CQI and surrounding base station-related information that the serving base station has, include the selection information in the active MBS zone change request message, and send the message to the MBS proxy function. Alternatively, the serving base station may newly select active member base station candidates by mixing the information sent by the user terminal and the information that the serving base station has, and send the selection information to the MBS proxy function as the active MBS zone change request message. In addition, at each time designated according to an MBS administration policy, the serving base station may select member base station candidates for a change of active MBS zone using the CQI and the surrounding base station-related information that the serving base station has separately from the user terminal, generate an active MBS zone change request message from the selection information, and send the active MBS zone change request message to the MBS proxy function.

The MBS proxy function receiving the active MBS zone change request selects a candidate base station for an active member from the received candidate base stations among member base stations constituting the MBS zone, and configures an active zone with the selected active member. After that, an MBS data path management function of an MBS controller establishes an MBS data path to the base station that has newly become the active member. Also, a radio resource management function requests allocation of radio resources necessary for each active member base station to transmit MBS traffic. The MBS user terminal creates a service flow between the base station and the user terminal through a serving base station currently connected with the MBS user terminal. Through the service flow, the user terminal obtains information necessary to receive the MBS, such as a new MBS zone ID, MCID, and SFID. Then, the active member base station sends MBS traffic received through a service delivery network to the user terminal using radio resources allocated for an MBS and control information necessary to send MBS traffic. The user terminal receives the MBS content passed through the MBS controller and the active member base station using the information obtained in the service flow setup operation. It is assumed that information on an MBS program is received through a separate procedure unrelated to the MBS.

Next, the following description concerns a case in which a user requests MBS cancellation and finishes an MBS. First, a user terminal sends a message such as IGMP leave to an MBS flow management function of an MBS controller, thereby notifying the MBS controller of MBS cancellation. An MBS proxy function of the MBS controller receives the cancellation request of the user, finds an active member that is providing the service to the user, and then deletes registration information on the user who has sent the service cancellation request. When there is no user receiving MBS traffic from the active member any more, the member base station is switched from the active status to the inactive status. Using an MBS data path management function, the MBS controller releases an MBS data path between the base station that has become inactive and the MBS controller. On the released path, no more MBS traffic is sent. However, an initial service flow that has been created in the member base station having become inactive is maintained as it is. In other words, MBS control information that is still used to receive MBS traffic is continuously sent to the user terminal like in the active member status. A radio resource management function retrieves radio resources that have been used to send MBS traffic by the member base station having newly changed into an inactive member. Here, the retrieved radio resources may be used for another service or left as they are without being used for the other service according to a policy of a service provider.

According to an embodiment of the present invention, an MBS zone maintains a fixed form that is readily managed according to a policy of an MBS provider, like in IEEE 802.16. Member base stations constituting the MBS zone are classified into active member base stations that transmit both MBS traffic and MBS control information and inactive member base stations that only transmit MBS control information, and MBS traffic is transmitted by the active member base stations only. For this reason, the other member base stations that do not participate in the MBS traffic transmission can use a band that is not used for the MBS traffic transmission for another service. In this way, by allocating resources that are not used for MBS traffic transmission to another purpose, it is possible to increase efficiency in the overall use of resources. When these resources are not used for another purpose but are left as they are, interference with the same channel used in an adjacent cell is reduced, and the corresponding channel signal is improved in quality.

In addition, according to an embodiment of the present invention, although a terminal moves to an inactive member area through handover, when the terminal is in the same MBS zone, the terminal receives MBS traffic sent by other active members using MBS flow information that the terminal has obtained already, and is thereby provided with seamless service.

Even when all components constituting an embodiment of the present invention are combined as one, or operate in combination with each other in the above description, the present invention is not limited to such an embodiment. In other words, within the aimed scope of the present invention, all the components can be selectively combined as one or more and operate. Also, each of the components may be implemented as one separate piece of hardware, or some or all of the components may be selectively combined and implemented as a computer program having a program module that performs some or all functions combined from one or a plurality of pieces of hardware. Codes and code segments constituting the computer program can be readily inferred by those of ordinary skill in the art. The computer program is stored in computer-readable media, and read and executed by a computer, thereby implementing an embodiment of the present invention. The storage media may include a magnetic recording medium, an optical recording medium, a carrier wave, and so on.

In addition, it will be understood that the terms "includes," "including," "has," and "having" used above specify the presence of stated components, but do not preclude the presence or addition of other components. Unless otherwise defined, all terms including technical and scientific terms are to be interpreted as is customary in the art to which this invention belongs. It will be further understood that terms in common usage should also be interpreted as is customary in the relevant art and not in an idealized or overly formal sense unless expressly so defined herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of providing a multicast and broadcast service (MBS) in a mobile communication environment, comprising:
    setting an MBS zone to be provided with content and include at least one member base station;
    configuring the MBS zone by classifying the at least one member base station belonging to the MBS zone into active members that simultaneously transmit MBS traffic and an MBS control parameter and inactive members that transmit only the MBS control parameter according to a predefined;
    retrieving radio resources of the member base station classified as the inactive member; and
    connecting a data delivery path through the active member, and transmitting the MBS traffic to a terminal.

2. The method of claim 1, wherein the setting of the MBS zone is performed during MBS initialization.

3. The method of claim 1, wherein channel quality information (CQI) is used in the configuring of the MBS zone.

4. The method of claim 3, wherein the CQI is measured by the terminal or a serving base station connected with the terminal.

5. The method of claim 1, wherein the configuring of the MBS zone includes determining the active member among the at least one member base station belonging to the MBS zone on the basis of whether or not there are radio resources usable for the MBS.

6. The method of claim 1, further comprising, before the transmitting of the MBS traffic to the terminal, transmitting the MBS control parameter to the terminal through the at least one member base station belonging to the MBS zone.

7. The method of claim 1, further comprising, when a specific event occurs, reconfiguring the MBS zone by classifying the at least one member base station again into active members and inactive members.

8. The method of claim 7, wherein the specific event occurs due to at least one of a zone change request and an MBS cancellation request from the terminal or a serving base station connected with the terminal.

9. The method of claim 8, wherein the zone change request is made in at least one manner among when the terminal starts the MBS, periodically in the middle of the MBS, and after handover of the terminal.

10. The method of claim 7, further comprising allocating radio resources to a member base station newly classified as an active member through the reconfiguring of the MBS zone.

11. The method of claim 1, wherein the retrieved radio resources are left as they are without being allocated to another type of service.

12. The method of claim 1, wherein the retrieved radio resources are allocable for another service.

13. An apparatus for providing a multicast and broadcast service (MBS) in a mobile communication environment, comprising:
    a proxy unit configured to set an MBS zone to be provided with content and include at least one member base station, and configure the MBS zone by classifying the at least one member base station belonging to the MBS zone into active members that simultaneously transmit MBS traffic and an MBS control parameter and inactive members that transmit only the MBS control parameter according to a predefined rule; and
    a data delivery path manager configured to establish a data delivery path through the active member determined by the proxy unit, and control the MBS traffic to be transmitted to a terminal; and
    a radio resource manager configured to control allocation and retrieval of radio resources to and from the at least one member base station, wherein the radio resource manager retrieves the radio resources from the member base station classified as the inactive member.

14. The apparatus of claim 13, further comprising a service flow manager configured to deliver the MBS control parameter necessary to deliver the MBS traffic to the at least one member base station belonging to the MBS zone, and create a service flow between the terminal and the member base station.

15. The apparatus of claim 13, wherein the proxy unit sets the MBS zone during MBS initialization.

16. The apparatus of claim 13, wherein the proxy unit configures the MBS zone using at least channel quality information (CQI).

17. The apparatus of claim 13, wherein the proxy unit determines the active member among the at least one member base station belonging to the MBS zone on the basis of whether or not there are radio resources usable for the MBS.

18. The apparatus of claim 13, wherein, when a specific event occurs, the proxy unit reconfigures the MBS zone by classifying the at least one member base station again into active members and inactive members.

19. The apparatus of claim 18,
wherein the radio resource manager allocates the radio resources to a member base station classified as an active member.

20. The apparatus of claim 19, wherein the radio resource manager leaves the retrieved radio resources as they are without allocating them to another type of service.

21. The apparatus of claim 19, wherein the radio resource manager allocates the retrieved radio resources for another type of service.

* * * * *